March 10, 1925.  1,529,479
F. F. FURR
AUTOMATIC DUMPING WAGON
Filed March 17, 1924
Fig. 1.
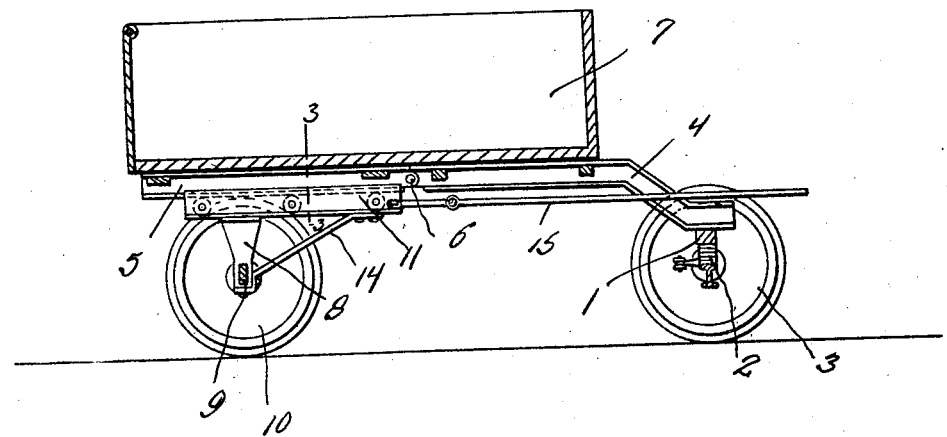
Fig. 2.
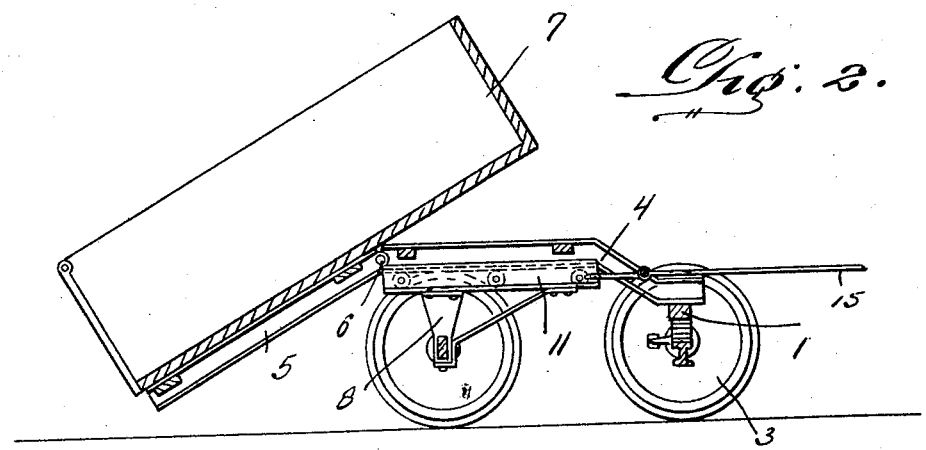
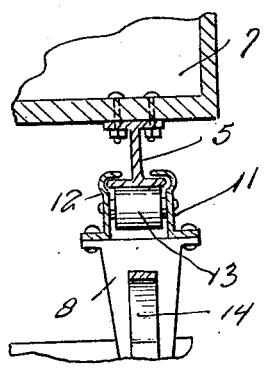
Fig. 3.
F. F. Furr,
Inventor
By Clarence A. O'Brien
Attorney Patented Mar. 10, 1925.

1,529,479

UNITED STATES PATENT OFFICE.

FLOYD F. FURR, OF STAUNTON, VIRGINIA.

AUTOMATIC DUMPING WAGON.

Application filed March 17, 1924. Serial No. 699,798.

*To all whom it may concern:*

Be it known that I, FLOYD F. FURR, a citizen of the United States, residing at Staunton, in the county of Augusta and State of Virginia, have invented certain new and useful Improvements in Automatic Dumping Wagons, of which the following is a specification.

This invention relates to new and useful improvements in dumping wagons and has for its principal object to provide a means whereby the wagon body will be caused to automatically dump upon the movement of the vehicle to which the same is attached in one direction, and will automatically return to its normal position when the vehicle is moved in the reverse direction.

A further object of the invention is to provide an automatic dumping wagon of the above mentioned character, wherein the same may be attached to the rear of a tractor or other vehicle and will at all times be in a position for operation without having to employ any complicated mechanical means which is to be controlled by the operator of the vehicle to which the device is attached.

A further object of the invention is to provide an automatic dumping wagon of the above mentioned character, wherein the wagon body is pivotally supported forwardly of its center of gravity on a movable truck section and normally is supported in a horizontal position on the movable truck section and the stationary truck section associated therewith, the wagon body being adapted to automatically tilt to a dumping position when the movable truck section is retracted with respect to the stationary truck section.

A further object of the invention is to provide an automatic dumping wagon of the above mentioned character, which is simple in construction, inexpensive, strong and durable, and further well adapted for the purposes for which it is designated.

Other objects and advantages of this invention will become apparent during the course of the following description.

In the accompanying drawing forming a part of this specification, and in which like numerals designate like parts throughout the same, Figure 1 is a side elevation of a trailer with parts shown in section, showing the wagon body in a horizontally supported position and the truck sections in an extended position with relation to each other, Figure 2 is a similar view showing the truck sections in retracted relation and the wagon body in a dumping position, and Figure 3 is a detail vertical section taken on line 3—3 of Figure 1.

The numeral 1 designates the front truck of the trailer and supports thereon the usual axle 2 and the wheels 3. Extending rearwardly from the truck 1 are the side members 4 which are substantially constructed of I-beams in the manner as clearly shown in Figure 3 of the drawing. The side rails 4 are further provided with the hinged elongated rear sections 5, the same being hingedly or pivotally secured in the forward portion of the side rails in the manner as shown at 6 in the drawing. The hinged sections 5 are secured to the bottom of the wagon box 7 by any suitable fastening means, such as shown in the drawing.

Cooperating with the front truck 1 and adapted to support the rear end of the wagon box 7 is the rear truck 8. The rear truck 8 is also provided with an axle 9 and the wheels 10 similar to the axle 2 and the wheels 3. The rear truck 8 has its side rails constructed in such a manner as to provide the spaced plates 11 and 12, which are secured at their base portions to the truck in any suitable manner, and the upper ends of the plates are curved inwardly to provide a guide means for receiving the lower portion of the rear section 5 of the side rails 4 which are carried by the front truck 1.

Supported in spaced relation between the plates 11 and which comprise the side rails of the rear truck 8 are the rollers 13. The same are journalled between the plates in any suitable manner, and are adapted to engage the bottom of the hinged sections of the side rails of the front truck when the trucks are moved with respect to each other in the manner as will be hereinafter more fully described. The manner in which the hinged sections of the side rails of the front truck 1 cooperate with the rollers and plates 11 and 12 of the side rails of the rear truck is clearly shown in Figure 3 of the drawing.

Suitable bracing means, such as is shown at 14 in the drawing, may extend from the forward end of the side rails of the rear truck to the axle 9 thereof in the manner as clearly shown in Figure 1 of the drawing. Extending forwardly from the plates 11 and 12 which comprises the side rails of the rear truck 9, is the securing rod 15, the forward end of which is fastened in any suitable manner to the vehicle to which the trailer is attached.

Normally when the trucks are arranged in the manner as shown in Figure 1 of the drawing, the wagon box 7 is supported on the side rails of the front and rear trucks and is filled with the material to be transported and dumped. The trailer, which comprises the dumping wagon, is fastened to the motor vehicle, such as a tractor or the like, in any well known manner, and it is not thought necessary to show and describe the same as it forms no important part of the present invention. It is also to be understood that the securing means 15 is attached to the vehicle which moves the trailer so as to prevent any possibility of the sections of the trucks from accidentally moving inwardly toward each other so as to cause the accidental tilting and dumping of the wagon box when the same is not desired.

When it is desired to dump the contents of the wagon box 7, the wheels 10 of the rear truck are chocked or otherwise held in a stationary position so that when the vehicle to which the trailer is attached is moved rearwardly, the same will cause a rearward movement of the front truck 1 and the rearward movement of the front truck will result in the hinged section 5 of the side rails 4 travelling over the rollers 13 between the plates 11 and 12 mounted on the stationary truck 9 and simultaneously causing a rearward movement of the wagon box 7. When the side rails 4 of the front truck have moved rearwardly until the forward end of the hinged sections 5 are adjacent the outer ends of the plates 11 and 12, the wagon box being supported on the hinged sections 5 of the side plates 4 and the latter being pivotally connected to the side rails 4 forwardly of the center of gravity of the wagon box, the latter will be caused to tilt downwardly to a dumping position, in the manner as clearly shown in Figure 2 of the drawing by the action of gravity. The end gate of the wagon box may then be removed and the contents thereof discharged onto the ground.

In order to return the wagon box and the front truck which supports the same thereon, to their normal positions, the chock is taken from the rear of the wheels 8 of the rear truck 9 and placed in the front of the wheels. The vehicle to which the trailer is connected is then moved forwardly and simultaneously the front truck 1 will also move forwardly and will simultaneously return the hinged sections of the side rails of the front truck into engagement with the rollers supported between the plates 11 and 12 which comprise the side rails of the rear truck and the wagon box 7 will again be caused to return to its horizontal position whereby the same will be supported on the side rails of the front and rear trucks in the manner as shown in Figure 1 of the drawing.

It will thus be seen from the foregoing description, that an automatic dumping wagon or trailer has been provided which does not require the necessity of having to employ complicated mechanical operating means for tilting and dumping the wagon box and furthermore the same will be automatically returned to its normal horizontal position on the forward movement of the vehicle to which the trailer is attached. The simplicity of my device enables the same to be easily and quickly placed in an operative position and furthermore the parts are so arranged as to be readily disassembled whenever necessary. A dumping wagon of the above mentioned character will not only be strong and durable, but also inexpensive.

While I have shown the preferred embodiment of my invention, it will be understood that various changes in the size, shape and arrangement of parts may be resorted to without departing from the spirit of the invention and the scope of the appended claims.

Having thus described my invention, what I claim is:

1. In a dumping wagon, the combination with a stationary rear truck, the latter having spaced plates supported thereon comprising side rails, rollers supported between said plates, a movable front truck, side rails mounted thereon, the rear ends of the last mentioned side rails being hinged and normally supported on said rollers between said plates, of a wagon box having its major portion supported on the hinged sections of said last mentioned side rails and adapted to normally extend in a horizontal position over the side rails of the front and rear trucks when said trucks are in extended relation with each other, said front movable truck adapted to be moved rearwardly on the side rails of the rear truck so that the hinged sections extend adjacent the outer ends of the side rails of the rear truck whereby the hinged sections and the wagon box carried thereby will automatically tilt to a dumping position.

2. In a dumping wagon, the combination with a stationary rear truck, the latter having spaced plates supported thereon comprising side rails, rollers supported between said plates, a movable front truck, side rails mounted thereon, the rear ends of the last mentioned side rails being hinged and normally supported on said rollers between said plates, of a wagon box having its major portion supported on the hinged sections of said last mentioned side rails and adapted to normally extend in a horizontal position over the side rails of the front and rear trucks when said trucks are in extended relation with each other, said front movable truck adapted to be moved rearwardly on the side rails of the rear truck so that the hinged sections extend adjacent the outer ends of the side rails of the rear truck whereby the hinged sections and the wagon box carried thereby will automatically tilt to a dumping position, and securing means associated with the stationary rear truck for connection with a vehicle which is adapted to draw the wagon and automatically cause the movement of the front truck simultaneously with the movement of the vehicle.

3. In a dumping wagon, the combination with a stationary rear truck, side rails mounted thereon, a movable front truck, side rails mounted thereon and adapted for sildable movement on the side rails of the stationary truck, the rear portions of the side rails of the movable front truck having extensions pivoted thereto and adapted to be slidably supported on the side rails of the stationary rear truck, and a wagon body having its major portion secured to the pivoted extensions, said wagon body adapted to tilt to a dumping position when the side rails of the movable section having their rear ends extending substantially flush with the rear ends of the side rails of the stationary rear truck.

In testimony whereof I affix my signature.

FLOYD F. FURR.